United States Patent

(12) United States Patent
Piech et al.

(10) Patent No.: US 9,915,307 B2
(45) Date of Patent: Mar. 13, 2018

(54) BRAKE

(71) Applicants: Zbigniew Piech, Cheshire, CT (US); Adrian D. West, New Britain, CT (US); Daryl J. Marvin, Farmington, CT (US); Harold Terry, New Hartford, CT (US)

(72) Inventors: Zbigniew Piech, Cheshire, CT (US); Adrian D. West, New Britain, CT (US); Daryl J. Marvin, Farmington, CT (US); Harold Terry, New Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 18 days.

(21) Appl. No.: 14/433,835

(22) PCT Filed: Nov. 15, 2012

(86) PCT No.: PCT/US2012/065177
§ 371 (c)(1),
(2) Date: Apr. 6, 2015

(87) PCT Pub. No.: WO2014/077811
PCT Pub. Date: May 22, 2014

(65) Prior Publication Data
US 2015/0240894 A1    Aug. 27, 2015

(51) Int. Cl.
*B60L 7/00*        (2006.01)
*F16D 65/18*       (2006.01)
(Continued)

(52) U.S. Cl.
CPC ............... *F16D 65/18* (2013.01); *B66B 5/18* (2013.01); *F16D 55/00* (2013.01); *F16D 55/228* (2013.01);
(Continued)

(58) Field of Classification Search
CPC ............ F16D 2121/18; F16D 2129/06; F16D 2129/065; F16D 63/002; F16D 55/228; B66B 5/18
See application file for complete search history.

(56) References Cited

U.S. PATENT DOCUMENTS 5,007,505 A * 4/1991 Lindegger ................ B66B 5/04
187/254
5,234,079 A    8/1993 Nomura
(Continued)

FOREIGN PATENT DOCUMENTS

CN    1225427 A    8/1999
CN    1793684 A    6/2006
(Continued)

OTHER PUBLICATIONS

English-language abstract of EP 2767727 (no date).*
(Continued)

*Primary Examiner* — Nicholas J Lane
(74) *Attorney, Agent, or Firm* — Cantor Colburn LLP

(57) ABSTRACT

A brake for machine and method of using the brake is disclosed. The brake may comprise first and second brake linings configured to be frictionally engageable with a rail, a first biasing member configured to urge the first brake lining to engage the rail, and a first actuator configured to move the first brake lining (38) to disengage the rail when the first actuator is energized. The brake may be configured to be mounted on a machine, floor or the like.

2 Claims, 10 Drawing Sheets

(51) Int. Cl.

| | | |
|---|---|---|
| *F16D 55/228* | (2006.01) | |
| *F16D 63/00* | (2006.01) | |
| *B66B 5/18* | (2006.01) | |
| *F16D 55/00* | (2006.01) | |
| *F16D 121/22* | (2012.01) | |
| *F16D 123/00* | (2012.01) | |
| *F16D 121/14* | (2012.01) | |
| *F16D 125/58* | (2012.01) | |

(52) U.S. Cl.
CPC ........ *F16D 63/008* (2013.01); *F16D 2121/14* (2013.01); *F16D 2121/22* (2013.01); *F16D 2123/00* (2013.01); *F16D 2125/582* (2013.01)

(56) References Cited

U.S. PATENT DOCUMENTS

| | | | |
|---|---|---|---|
| 5,648,644 | A | 7/1997 | Nagel |
| 5,671,829 | A | 9/1997 | Rivera |
| 5,791,442 | A * | 8/1998 | Arnold ................ H01F 5/00 188/138 |
| 6,161,653 | A | 12/2000 | Skalski et al. |
| 6,193,026 | B1 | 2/2001 | Sevilleja et al. |
| 6,425,462 | B1 | 7/2002 | Tran et al. |
| 2004/0262091 | A1 | 12/2004 | Ito |
| 2005/0241886 | A1 | 11/2005 | Marti |
| 2006/0180406 | A1 | 8/2006 | Gremaud |
| 2007/0272500 | A1 | 11/2007 | Greamaud |
| 2008/0128218 | A1 | 6/2008 | Gremaud |
| 2008/0135345 | A1 | 6/2008 | Kocher et al. |
| 2008/0136279 | A1 * | 6/2008 | Berndt .................. F16D 55/02 310/93 |
| 2010/0230216 | A1 | 9/2010 | Fuchs et al. |
| 2012/0211311 | A1 * | 8/2012 | Piech ..................... B66B 5/16 187/351 |
| 2015/0259175 | A1 * | 9/2015 | West ...................... B66B 5/18 187/359 |

FOREIGN PATENT DOCUMENTS

| | | | | |
|---|---|---|---|---|
| CN | 2823664 | Y | 10/2006 | |
| CN | 101363489 | A | 2/2009 | |
| EP | 0009180 | | 6/1982 | |
| EP | 0693633 | A2 * | 1/1996 | ........... F16D 65/186 |
| EP | 1431226 | A1 | 6/2004 | |
| EP | 2767727 | A1 * | 8/2014 | ............. F16D 65/18 |
| JP | 2001-159431 | | 6/2001 | |
| JP | 2005-090567 | | 4/2005 | |
| JP | 2007022772 | A | 2/2007 | |
| JP | 2008-128305 | | 6/2008 | |
| WO | 2011146071 | A1 | 11/2011 | |

OTHER PUBLICATIONS

"Force Between Magnets" (https://web.archive.org/web/20111021123430/https://en.wikipedia.org/wiki/Force_between_magnets) (Oct. 4, 2011).*

International Search Report for related PCT Application No. PCT/US2012/065177; dated Aug. 16, 2013.

Chinese Office Action and Search Report for application CN 201280077107.5, dated Feb. 3, 2016, 11 pages.

European Search Report for application 12888423.6, dated Jun. 30, 2016, 7 pages.

International Search Report and Written Opinion for application PCT/US2012/065183, dated, 8 pages.

Chinese Office Action and Search for application 201280077122.X, dated Aug. 31, 2016, 8 pgs.

Chinese Second Office Action for application CN 201280077122.X, dated Feb. 23, 2017, 10pgs.

* cited by examiner

BRAKE

CROSS-REFERENCE TO RELATED APPLICATION

This Application is a 35 USC § 371 U.S. National Stage filing of International Application No. PCT/US2012/065177 filed on Nov. 15, 2012.

FIELD OF THE DISCLOSURE

The present disclosure generally relates to braking devices, and, in particular, relates to a braking device for use with industrial machines, and the like.

BACKGROUND OF THE DISCLOSURE

Machines may employ an electromechanical brake to stop or temporarily hold a particular motion. Such brakes may generally employ a clutch-type braking mechanism for supplying a holding or braking torque that is sufficient for slowing or holding of a particular motion.

The braking torque supplied by clutch-type brakes is mechanically produced by the friction that is generated between a rail, a rotating disk brake, or the like, and a set of friction pads that are releasably placed in contact with a surface of the disk brake, rail, or the like. The engagement or disengagement of the friction pads may be mechanically or electromechanically controlled. Although such brakes may be effective and are widely used today, they still have room for improvement. A better, more efficient design is desired.

SUMMARY OF THE DISCLOSURE

In accordance with one aspect of the disclosure, a brake is disclosed. The brake may comprise first and second brake linings configured to be frictionally engageable with a rail, a first biasing member configured to urge the first brake lining to engage the rail, and a first actuator configured to move the first brake lining to disengage the rail when the first actuator is energized. The brake may be configured to be mounted on a machine.

In accordance with another aspect of the disclosure, a brake system is disclosed. The brake system may include a brake disk and a brake. The brake may include first and second brake linings configured to be frictionally engageable with the disk, a first biasing member configured to urge the first brake lining to engage the disk when a first flux path is generated by the first biasing member, and a first actuator configured to redirect the first flux path into a second flux path to disengage the first brake lining from the disk when the first actuator is energized.

In accordance with yet another aspect of the disclosure, a method for moving a brake is disclosed. The method may include providing the brake mounted on a machine, the brake comprising first and second brake linings configured to be frictionally engageable with a rail, a first biasing member and a first actuator that includes a backing block and a first solenoid housed in the backing block, generating a first flux path, and energizing the solenoid of the first actuator to generate electromagnetic force that disengages the first brake lining from the rail by redirecting the first flux path into a second flux path, the second flux path different from the first.

These and other aspects of this disclosure will become more readily apparent upon reading the following detailed description when taken in conjunction with the accompanying drawings.

Figure 1:
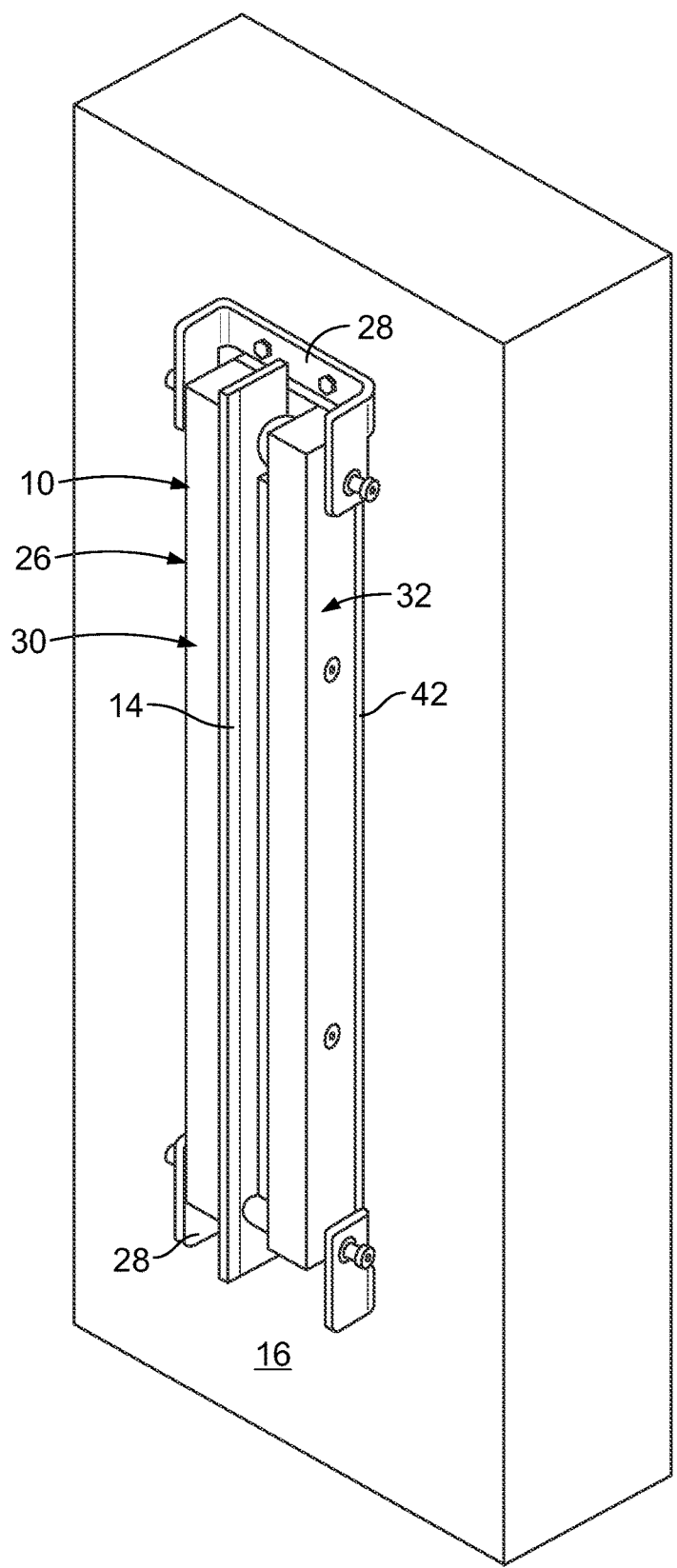
FIG. 1 is a perspective view of an exemplary embodiment of a brake constructed in accordance with the teachings of the disclosure.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling within the spirit and scope of the present disclosure.

DETAILED DESCRIPTION OF THE DISCLOSURE

In FIG. 1, one embodiment of a brake system 10 is disclosed. The brake 26 may be disposed on a rail, brake disk of a machine, or the like 14 (each herein referred to as a "rail" in the Detailed Description of the Disclosure) of a brake system 10. To better illustrate the brake 26 only the portion of the rail 14 disposed between the components of the brake 26 is shown in FIG. 1.

The brake 26 may be secured to the machine 16 or floor adjacent to the machine (16) by one or more supports 28. Each support 28 may have a general u-shape or another appropriate geometry. In the embodiment illustrated in FIG. 1, a support 28 may be located at each end of the brake 26. One or more brakes 26 may be utilized.

Figure 2:
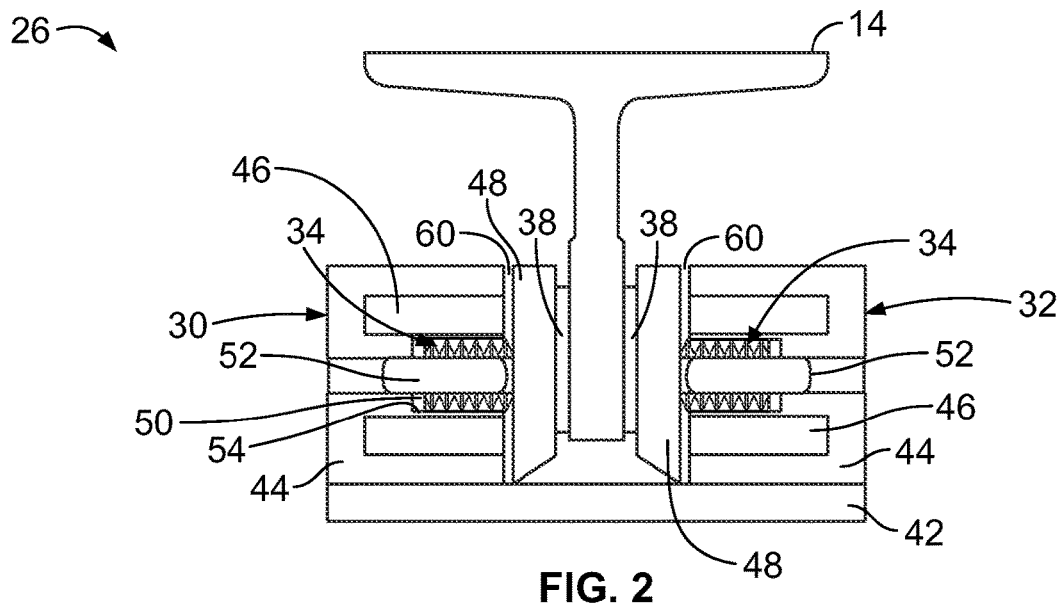
FIG. 2 is a cross-sectional view of the brake of FIG. 1.
Figure 3:
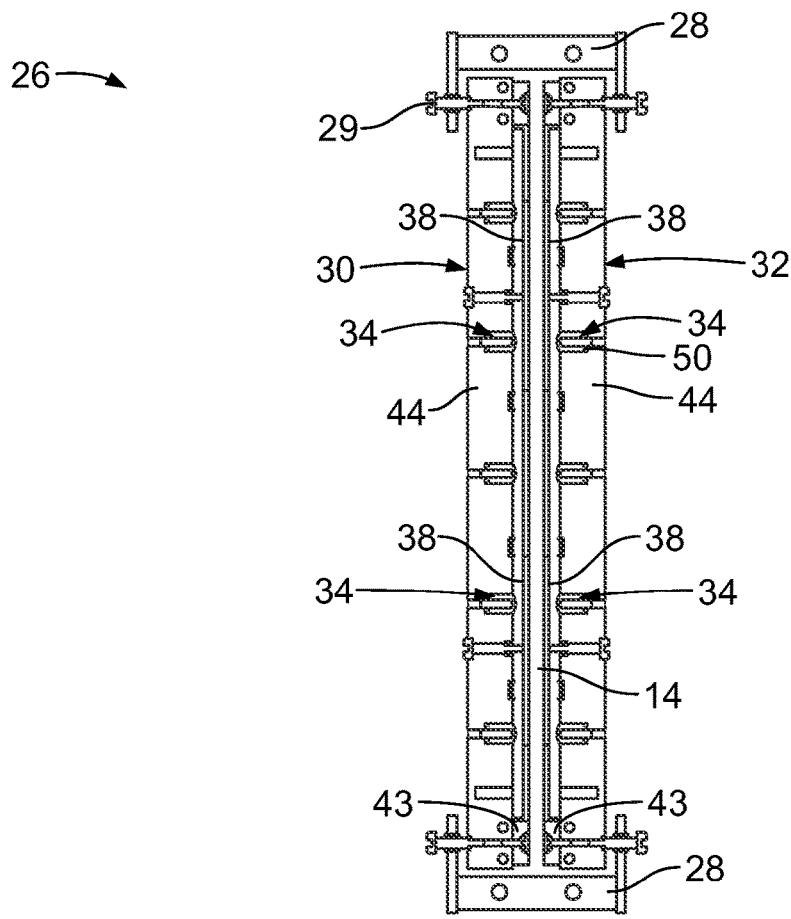
FIG. 3 is another cross-sectional view of the brake of FIG. 1 in a dropped state.
Figure 4:
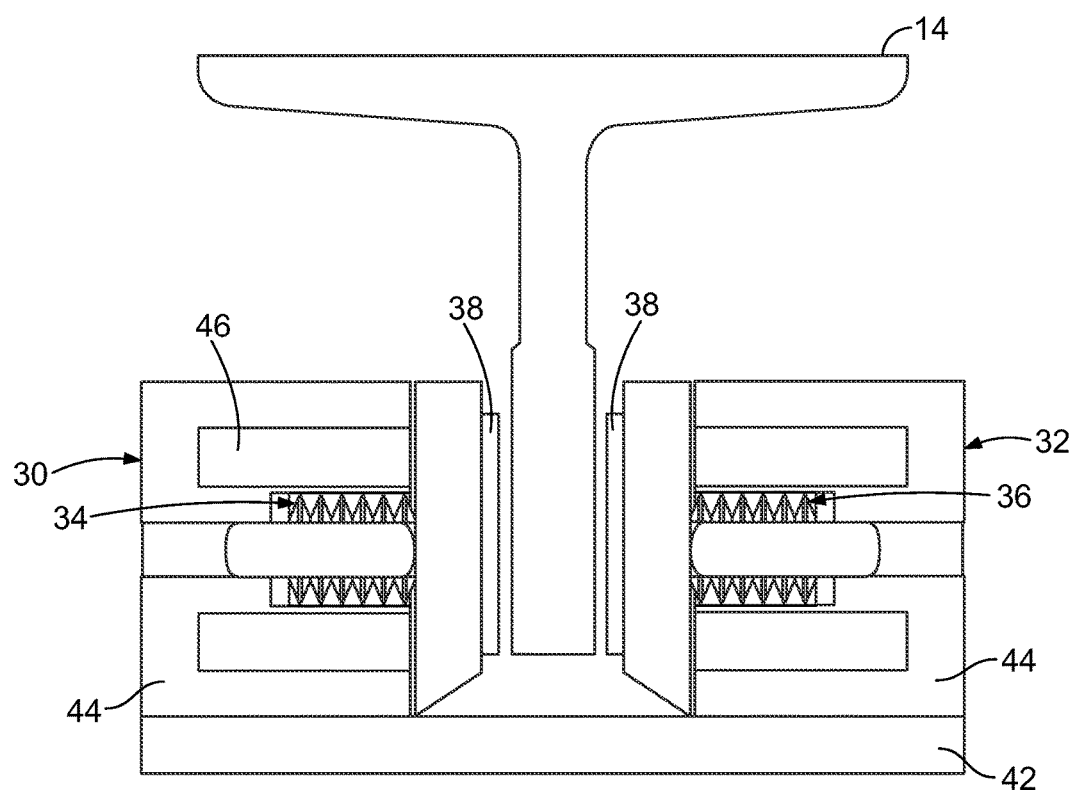
FIG. 4 is another cross-sectional view of the brake of FIG. 1 in a picked state.
Figure 5:
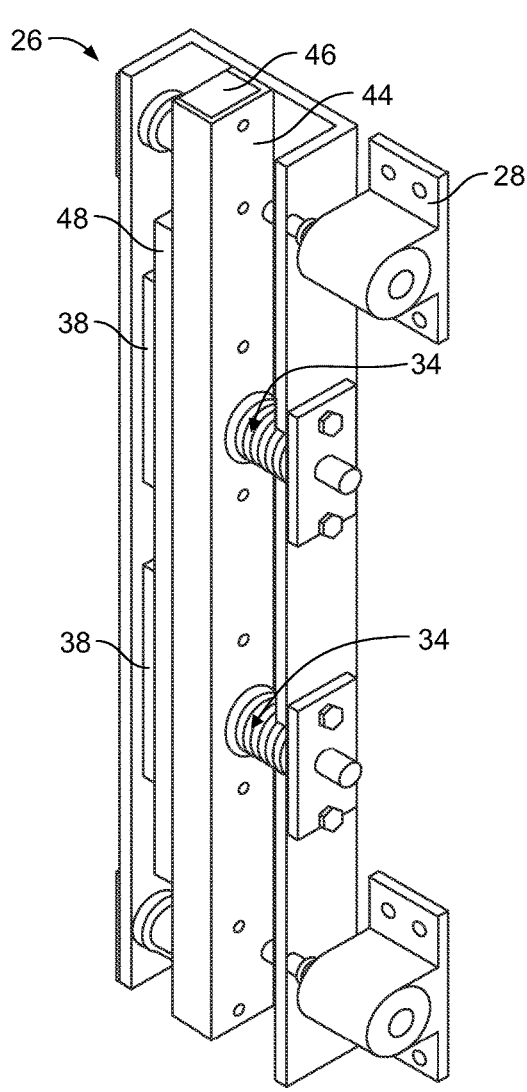
FIG. 5 a perspective view of another embodiment of a brake constructed in accordance with the teachings of the disclosure.

FIG. 2 illustrates a cross sectional view of the brake 26 on a rail 14. The view is taken along the width of the brake 26. FIGS. 3-4 each illustrate another cross sectional view of the brake on a rail 14. In FIG. 3 the brake is shown in the dropped state and in FIG. 4 the brake 26 is shown in the picked or released state. In the embodiment of a brake 26 illustrated in FIGS. 1-4, each brake 26 may comprise first and second actuators 30, 32 (best seen in FIGS. 2 and 4), a plurality of biasing members 34 and a plurality of brake linings 38. The brake system may also comprise a mount 42 and brake guides 43.

The first actuator 30 may include a backing block 44, a solenoid 46 and an armature 48. The backing block 44 of the first actuator 30 may be disposed on a first side of the rail 14 and may be secured to the mount 42. In the exemplary embodiment illustrated in FIGS. 1-4, each backing block 44 has a solenoid 46, as is known in the art, housed within it. In other embodiments, more than one solenoid 46 may be housed in the backing block 44.

The armature 48 of the first actuator 30, along with one or more brake linings 38 affixed thereto, may be disposed between the backing block 44 and the first side of the rail 14. The armature 48 may be of a magnetic material and may be axially moveable between an engaged position and a disengaged position. In the engaged position, the armature 48 of the first actuator 30 may be moved toward the rail 14 such that the brake linings 38 engage the rail 14 to slow, stop or hold the machine 16 via friction. In the disengaged position, the armature 48 of the first actuator 30 and the brake linings 38 may be moved axially away from the rail 14 toward the backing block 44 (of the first actuator 30) such that the first brake lining 38 no longer engages the first side of the rail 14.

As can be seen in FIGS. 1-4, the second actuator 32 may be disposed on the other side of the rail 14, a second side, opposite to the first actuator 30. Like the first actuator 30, the second actuator 32 may include a backing block 44, a solenoid 46 and an armature 48. The backing block 44 of the second actuator 32 may be disposed on the second side of the rail 14 and may be secured to the mount 42. One or more solenoids 46 may be housed in such backing block 44. In the embodiment illustrated in FIGS. 1-4, one solenoid 46 is disposed in the backing block 44 of the second actuator 32.

The armature 48 of the second actuator 32, along with one or more brake linings 38 affixed thereto, may be disposed between the backing block 44 of the second actuator 32 and the second side of the rail 14. The armature 48 may be of a magnetic material and may be axially moveable between an engaged position and a disengaged position. In the engaged position, the armature 48 of the second actuator 32 may be moved toward the rail 14 such that the brake linings 38 engage the rail 14 to slow, stop or hold movement of (or in) the machine 16 via friction. In the disengaged position, the armature 48 of the second actuator 32 and the brake linings 38 may be moved axially away from the rail 14 toward the backing block 44 of the second actuator 32 such that the brake linings 38 no longer engage the second side of the rail 14.

Referring to FIGS. 2-3, the armature 48 of the first actuator 30 is biased toward the rail 14 by one or more biasing members 34 housed in the backing block 44 of the first actuator 30. The armature 48 of the second actuator 32 is biased toward the rail 14 by one or more biasing members 34 housed in the backing block 44 of the second actuator 32. In one embodiment, each biasing member 34 may be a spring, a disc spring stack, or the like. Each biasing member 34 may be located in a pocket 50 in the backing block 44, and in some embodiments may be arranged around a guide pin 52, or the like, that acts as a guide for the biasing member 34. Alternatively, a pocket 50 wall 54 may act as the guide. In some embodiments, the biasing members 34 may be external to the backing block 44 that houses the solenoid 46.

Referring to FIG. 3, the brake 26 is secured to the supports 28 with side-to-side play to allow side to side movement of the brake 26 relative to the supports 28. This allows the brake 26 to follow any waves, or other such changes, in the rail position along the length of the rail 14. In some embodiments, the play is achieved by mounting the brake 26 to the supports 28 by one or more mounting pins 29 extending from the backing blocks 44 through the supports 28.

The brake 26 may include one or more brake guides 43. The brake guides 43 may be formed from a low friction material and are located adjacent to each side of the rail 14. The brake guides 43 extend toward the rail 14 and are utilized to maintain a selected distance between the brake linings 38 and the rail 14 when the brake is not activated. The brake guides 43 are generally fixed relative to the brake 26. When activated, the armatures 48 and brake linings 38 move toward the rail 14 and relative to the backing blocks 44 and brake guides 43.

FIG. 2 illustrates the default state of the exemplary brake 26, in which both armatures 48 are in the engaged position and the brake 26 is in the dropped state. The necessary braking force to slow, stop or hold movement of the machine 16 is provided by the bias force of the biasing members 34 against the armatures 48, and by the frictional forces of the brake linings 38 on the rail 14. The bias force of each biasing member (in the exemplary embodiment, the physical force applied by the spring stack) against the armatures 48 moves the armatures 48 toward the rail 14 and forces the brake linings 38 into contact with the rail 14. A relatively small air gap 60 can be seen between the backing block 44 and the armatures 48 while in this position.

When energized with an electrical current, the coils of the solenoid 46 in the first actuator 30 generate a magnetic field that overcomes the bias force of the biasing members 34 (disposed in the backing block 44 of the first actuator 30) and draws the armature 48 toward the backing block 44 (of the first actuator 30) and the brake linings 38 away from the rail 14. Likewise, when energized with an electrical current, the electrical coils of the solenoid 46 in the second actuator 32 generate a magnetic field that overcomes the bias of the biasing members 34 (housed in the backing block 44 of the second actuator 32) and draws the armature 48 toward the backing block 44 (of the second actuator 32) and the brake linings 38 away from the rail 14. As illustrated in FIG. 4, the solenoids 46 of both actuators 30, 32 are energized, the brake system 26 is in the picked state and movement along the rail 14 may occur. A gap can now be seen between the brake linings 38 and the rail 14 while in this position. When it is desired to slow, stop or hold the machine, the electrical coils of each solenoid 46 are de-energized, thereby allowing the biasing members 34 to once again urge the brake linings 38 into contact with the rail 14 without interference from the offsetting electromagnetic force provided by the energized solenoids 46.

Figure 6:
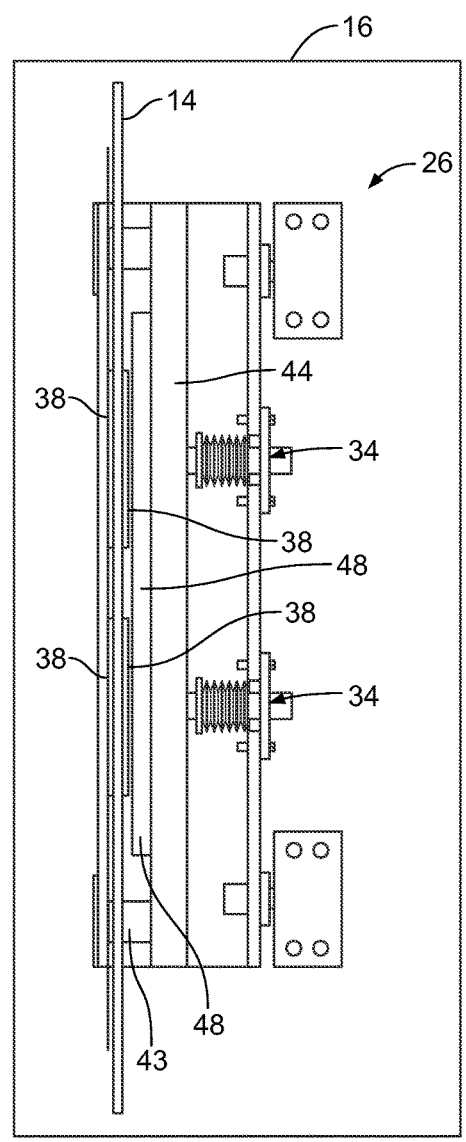
FIG. 6 is a top view of the brake of FIG. 5.

Referring now to FIGS. 5-8, another embodiment of the brake 26 is illustrated. The brake 26 is secured to the machine 16 or floor by one or more supports 28. In this embodiment, the brake 26 may be single-sided with a fixed brake lining 38 at the second side of the rail 14 and a moveable armature 48 and brake lining 38 disposed at the first side of the rail 14. In FIG. 6, a portion of the rail 14 has been removed to better illustrate the brake 26. In the embodiment illustrated in FIGS. 5-8 each brake 26 may comprise a first actuator 30 (best seen in FIG. 8), one or more biasing members 34 and a plurality of brake linings 38. The brake system may also comprise a mount 42 and one or more brake guides 43. The mount may be u-shaped or any other appropriate shape and the first actuator 30, biasing members 34 and brake linings 38 may be disposed inside the mount 42.

The first actuator 30 may include a backing block 44, a solenoid 46 and an armature 48. The backing block 44 may be adjacent to a first side of the rail 14 and may be secured to the mount 42. In the exemplary embodiment illustrated in FIGS. 5-8, the backing block 44 has a pair of solenoids 46 housed within it. In other embodiments, greater or fewer solenoids 46 may be housed in the backing block 44. The armature 48 may, along with the brake lining(s) 38 affixed thereto, be disposed between the backing block 44 and the first side of the rail 14. The armature 48 may be of a magnetic material and may be axially moveable between an engaged position and a disengaged position. In the engaged position, the armature 48 may be moved toward the rail 14 such that the brake lining(s) 38 engage the rail 14 and push the rail against the brake lining(s) affixed to the mount 42 to slow, stop or hold the machine 16 via friction, this is known as the dropped state of the brake 26. In the disengaged position, the armature 48 and the brake lining(s) 38 affixed thereto may be moved axially away from the rail 14 toward the backing block 44 such that the brake lining(s) 38 no longer engage the first side of the rail 14. This is known as the picked state.

As can be seen in FIGS. 5-8, the one or more brake linings 38 are affixed to the side of the mount 42 and are disposed between a side of the rail 14 and the mount 42. The armature 48 may be axially moveable between an engaged position and a disengaged position. In the engaged position, the armature 48 may be moved toward the rail 14 such that the brake lining(s) 38 engage the rail 14 to slow, stop or hold the machine 16 via friction. In the disengaged position, the armature 48 and brake lining(s) 38 may be moved axially away from the rail 14 toward the backing block 44 such that the brake lining(s) 38 no longer engage the rail 14.

More specifically, the armature 48 is biased toward the rail 14 by the biasing member(s) 34. In one embodiment, each biasing member 34 may be a spring, a disc spring stack, or the like. The biasing member 34 may be external to the backing block 44 that houses the solenoid 46 and may be arranged around a pin 52 that acts as a guide for the biasing member 34. In other embodiments, the biasing member(s) 34 may be partially or entirely internal to the backing block 44.

Figure 7:
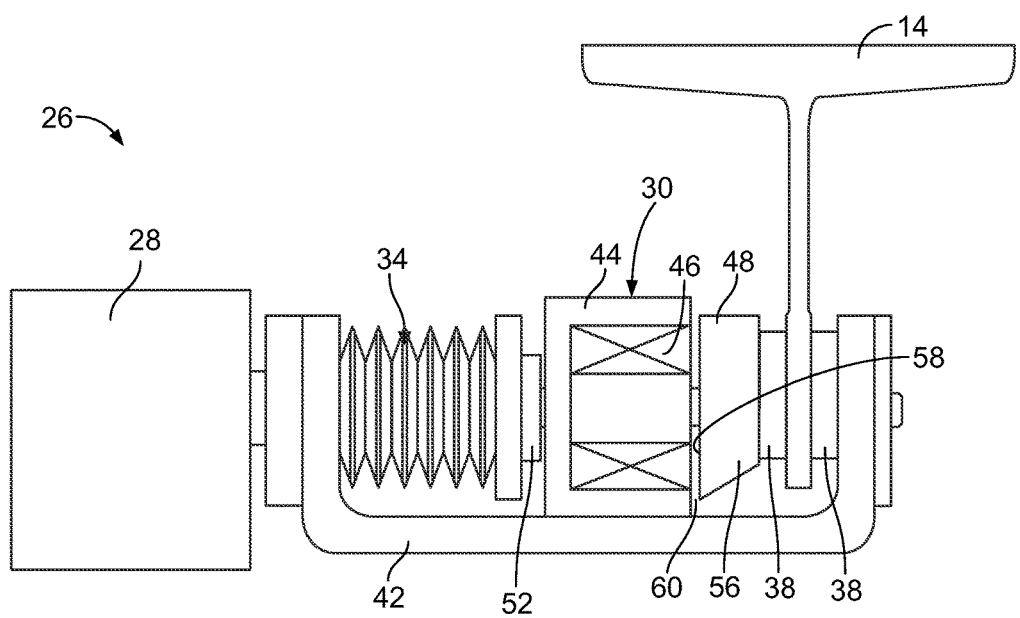
FIG. 7 is another cross-sectional of the brake of FIG. 5 in a dropped state.

In the default state of the exemplary brake 26, the armature 48 is in the engaged position and the brake 26 is in the dropped state. As illustrated in FIG. 7, the necessary braking force to slow, stop or hold the machine 16 is provided by the bias force of the biasing member(s) 38 (in the exemplary embodiment, the spring force of the spring stacks) forcing the brake lining(s) 38 affixed to the armature 48 into contact with the rail 14 and the rail 14 into contact with the brake lining(s) 38 affixed to the mount 42, and by the frictional forces of the brake linings 38 on the rail 14. When the braking force applied by the brake system 26 stops movement of the machine 16, the brake 26 is in the dropped state.

Figure 8:
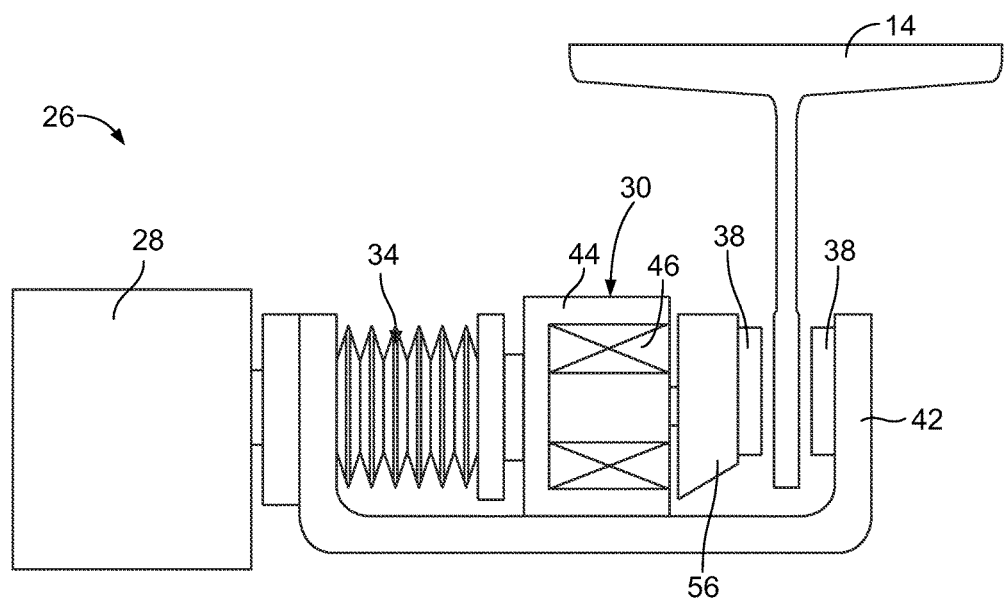
FIG. 8 is another cross-sectional of the brake of FIG. 5 in a picked state.

When energized, the electrical coils of the solenoid 46 of the first actuator 30 generate a magnetic field to overcome the bias of the biasing member(s) 34 and draw the armature 48 across the air gap 60 (best seen in FIG. 7) toward the backing block 44 and the brake lining(s) 38 (affixed to the armature 48) away from the rail 14. As illustrated in FIG. 8, the solenoid 46 is energized, the brake system 26 is in the picked state and movement along the rail 14 may occur. When it is desired to slow, stop or hold the machine, the electrical coils of the solenoid 46 are de-energized, thereby allowing the biasing member(s) 34 to urge the brake lining(s) 38 affixed to the armature 48 into contact with the rail 14 and the rail into contact with the brake lining(s) 38 affixed to the mount 42.

The armature 48 of either the first 30 or second actuator 32, or of both, may be, in some embodiments, sloped or wedge-shaped at one or both ends. In the embodiments illustrated in FIGS. 2 and 4 and FIGS. 7-8, the armature 48 may be sloped at the bottom end 56 toward the backing block 44. Such geometry beneficially increases the surface area of the armature 48 face 58 adjacent to the air gap 60 between the solenoid 46 and the armature 48 while reducing the possibility of physical interference of the armature 48 with the braking action. By increasing the surface area of the face 58 near the relatively small air gap 60, a strong magnetic bond may be created between the armature 48 and the backing block 44.

Figure 9:
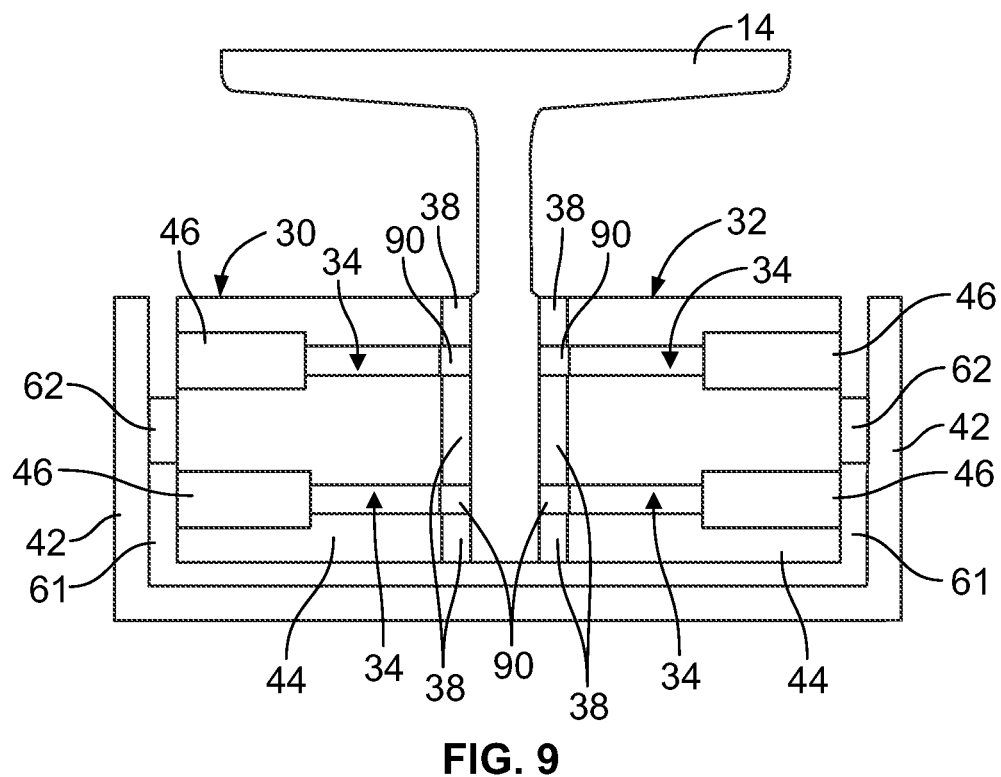
FIG. 9 is a cross-sectional view of another embodiment of a brake constructed in accordance with the teachings of the disclosure, the brake is in the dropped state.
Figure 10:
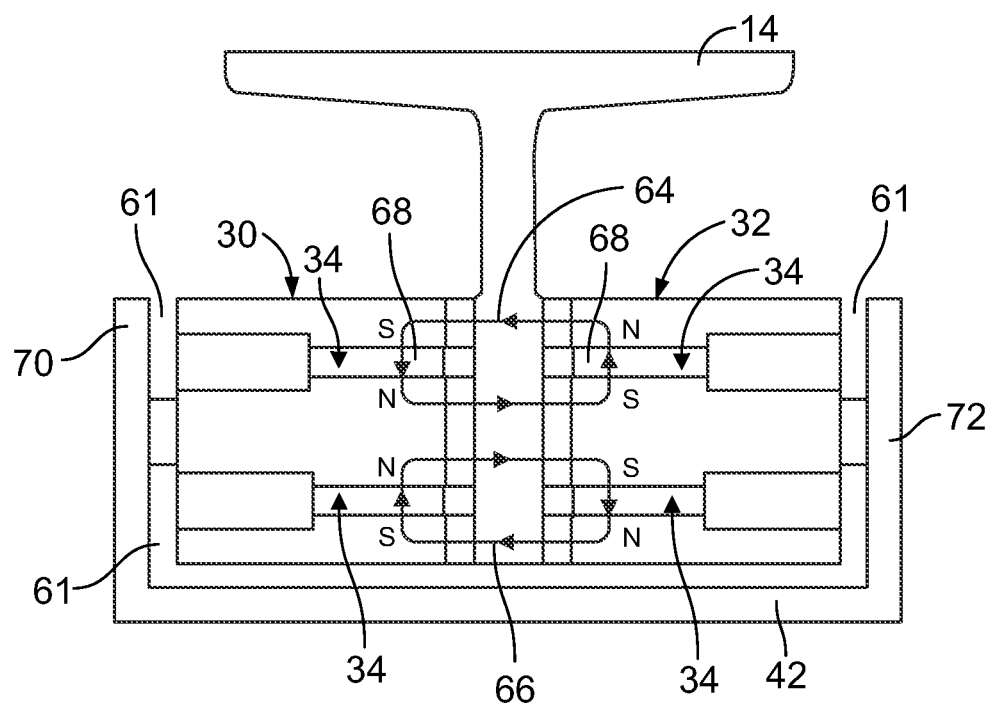
FIG. 10 is a cross-sectional view of the brake of FIG. 9 in a dropped state with the lines of magnetic flux schematically illustrated.
Figure 11:
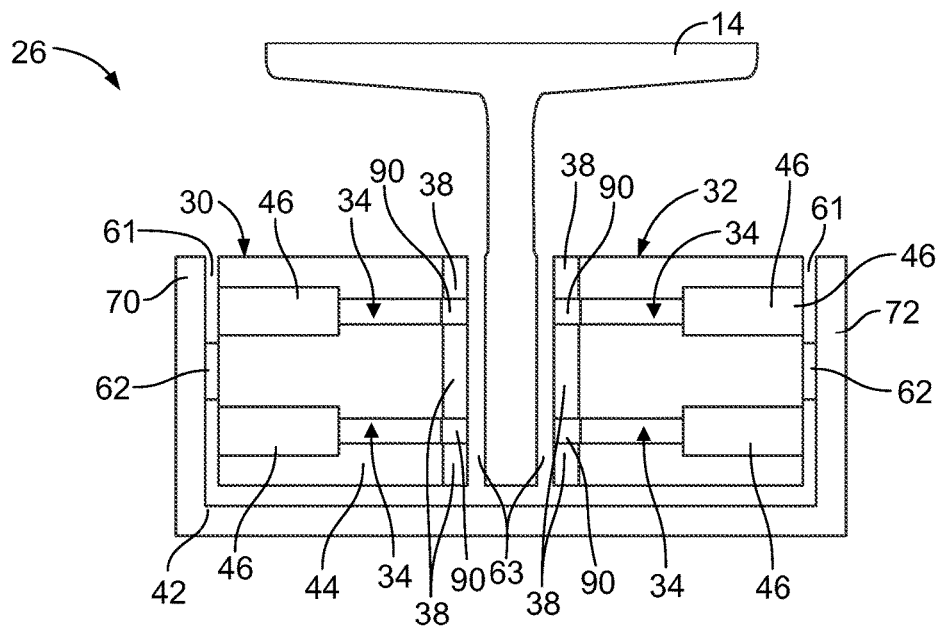
FIG. 11 is a cross-sectional view of another embodiment of a brake constructed in accordance with the teachings of the disclosure, the brake is in a picked state.
Figure 12:
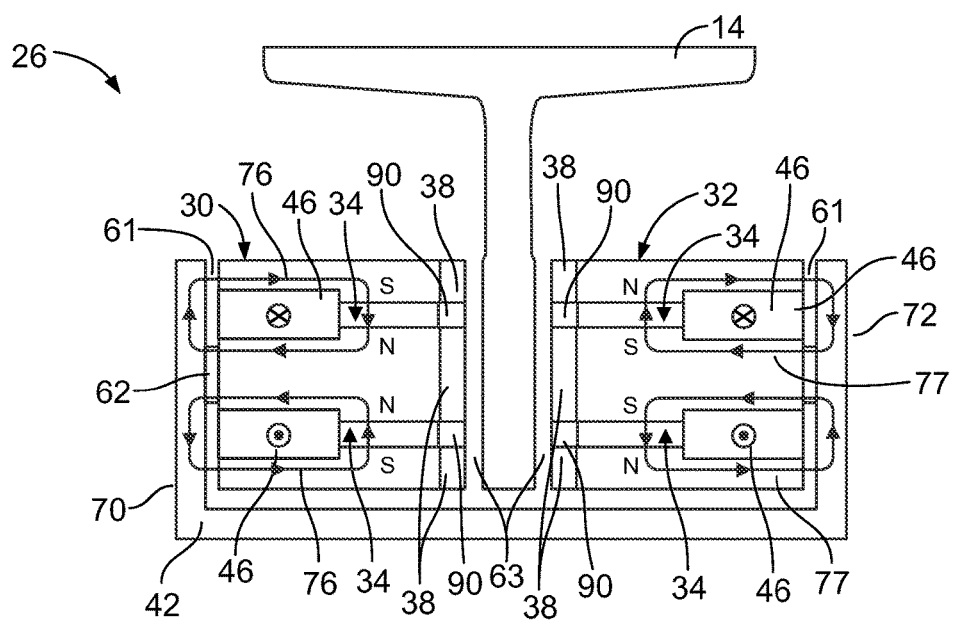
FIG. 12 is a cross-sectional view of the brake of FIG. 10 in a picked state with the lines of magnetic flux schematically illustrated.

Referring now to FIGS. 9-12, another embodiment of a brake on a rail 14 is disclosed. FIG. 9 illustrates the brake 26 in a dropped state, and FIG. 10 schematically illustrates the magnetic flux through the brake 26 while in the dropped state of FIG. 9. FIG. 11 illustrates the brake in the picked or released state and FIG. 12 schematically illustrates the lines of magnetic flux through the brake 26 while in the picked state of FIG. 11. Similar to the previous embodiments, the brake 26 may be secured to the machine 16, floor, or the like by one or more supports. One or more brakes 26 may be utilized.

In the embodiment illustrated in FIGS. 9-12, each brake 26 may comprise first and second actuators 30, 32, a plurality of biasing members 34 and a plurality of brake linings 38. The brake 26 may also comprise a mount 42 and brake guides (not shown in FIGS. 9-12).

The first actuator 30 may include a backing block 44 and one or more solenoids 46. The backing block 44 (of the first actuator 30) may be disposed near a first side of the rail 14 and may be slidably secured to the mount 42 by an actuator pin 62. The backing block 44 may be configured to slide axially on the actuator pin 62 toward and away from the rail 14. The mount 42 may be generally u-shaped or any other appropriate shape. The backing block 44 has one or more solenoids 46, as are known in the art, housed within it.

One or more brake lining(s) 38 may be affixed to the backing block 44 and may be disposed between the backing block 44 and the first side of the rail 14. In some embodiments, a non-magnetic portion 90 may be disposed between the brake linings 38. Such a non-magnetic portion 90, in one embodiment, may be an air gap. The backing block 44 may be axially moveable on the actuator pin 62 between an engaged position and a disengaged position. In the engaged position, the backing block 44 may be moved toward the rail 14 such that the brake lining(s) 38 engage the rail 14 to slow, stop or hold the machine 16 via friction. In the disengaged position, the backing block and the brake lining(s) 38 may be moved axially away from the rail 14 along the actuator pin 62 such that the brake lining(s) 38 no longer engage the first side of the rail 14.

As can be seen in FIGS. 9-12, the second actuator 32 may be disposed on the other side of the rail 14, a second side, opposite to the first actuator 30. Like the first actuator 30, the second actuator 32 may include a backing block 44 and one or more solenoids 46. The backing block 44 of the second actuator 32 may be disposed near a second side of the rail 14 and may be slidably secured to the mount 42 by another actuator pin 62. The backing block 44 may be configured to slide on the actuator pin 62 toward and away from the rail 14. The one or more solenoids 46 are housed in the backing block 44 of the second actuator 32. One or more brake linings 38 may be affixed to the backing block 44 and may be disposed between the backing block 44 and the second side of the rail 14. In some embodiments, a non-magnetic portion 90 may be disposed between the brake linings 38. Such a non-magnetic portion 90, in one embodiment, may be an air gap. The backing block 44 may be axially moveable between an engaged position and a disengaged position. In the engaged position illustrated in FIG. 9, the backing block 44 have been moved toward the rail 14 such that the brake lining(s) 38 (affixed to the second actuator 32) engage the rail 14 to slow, stop or hold the machine 16 via friction. In the disengaged position illustrated in FIG. 11, the backing block 44 and the brake lining(s) 38 have been moved axially away from the rail 14 such that the brake lining(s) 38 no longer engage the second side of the rail 14.

Referring to FIGS. 9-10, the backing block 44 and the brake lining(s) 38 of the first actuator 30 are biased toward the rail 14 by one or more biasing member(s) 34. Similarly, the backing block 44 and the brake lining(s) 38 of the second actuator 32 are also biased toward the rail 14 by one or more biasing member(s) 34. In one embodiment, each biasing member 34 may comprise a permanent magnet. While the view illustrated in FIGS. 9-10 only shows two biasing members 34 housed in each of the first actuator 30 and in the second actuator 32, there may be more than two biasing members 34 housed in the backing block 44 of each actuator 30, 32.

The dropped state may be the default state of the exemplary brake 26. In such a state, both actuators 30, 32 may be in the engaged position as illustrated in FIG. 9. In the dropped state, each biasing member 34 housed in the first actuator 30 applies a normal force on the moveable first actuator 30 toward the rail 14. Similarly, the biasing members 34 housed in the second actuator 32 apply a normal force on the moveable second actuator 32 toward the rail 14. This normal force is generated by the magnetic force generated by the permanent magnets of the biasing members 34. In the dropped state the moveable actuators 30, 32 force the brake linings 38, affixed to the actuators 30, 32 into contact with the guide rail 14. The resulting friction between the guide rail 14 and the brake lining 38 material stops and holds movement of the machine 16.

FIG. 10 is a schematic illustration of the lines of magnetic flux as it flows between a biasing member 34 on one side of the rail to another biasing member 34 on the other side of the rail when the brake 26 is in the dropped state. The brake linings 38 may be made of a ferromagnetic or semi-magnetic material whereas the rail 14 may be made of ferromagnetic steel. The material of the brake lining and the material of the rail enable the flow of magnetic flux through them.

Each biasing member 34 on one side of the rail 14 is magnetically coupled to a corresponding opposed biasing member 34 on the other side of the rail to form a pair 68. In each pair 68, the polarity of the permanent magnet of a biasing member 34 on one side of the rail 14 is inverted in relation to the corresponding permanent magnet of a biasing member 34 on the other side of the rail 14 such that the magnetic flux generated by the permanent magnets (of the biasing members 34) flows through the brake linings 38 and the rail 14 as illustrated in FIG. 10. The attraction of the permanent magnets 34 in each pair 68 generates a magnetic field that draws the magnets (biasing members 34) and the moveable actuators 30, 32 (to which they are affixed) toward each other and toward the rail 14. This results in a clamping force being applied on the rail 14. In the embodiment illustrated in FIG. 10, there is shown a pair of biasing members 34 (each comprised of a permanent magnet) that together generate a first flux path 64. Similarly, there is also shown a pair of biasing members 34 (each comprised of a permanent magnet) that together generate a second flux path 66. In this embodiment, the first flux path 64 may have a magnetic field with magnetic flux that flows in the counter clockwise direction and the second flux path 66 may have a magnetic field with magnetic flux that flows in the clockwise direction. An air gap 61 can be seen between the mount 42 and each of the actuators 30, 32.

When energized, the electrical coils of the solenoid 46 in the first actuator 30 generate a magnetic field, as is known in the art. The current energizing the solenoid 46 must be sufficient enough to create a magnetic field that redirects the flux of the permanent magnets of the biasing members 34 and, in doing so, causes the first actuator 30 to slide on the actuator pin 62 across the air gap 61 and toward the first side 70 of the mount 42, thereby drawing the first actuator 30 and the brake lining(s) 38 affixed thereto away from the rail 14.

Likewise, when energized, the electrical coils of the solenoid 46 in the second actuator 32 generate a magnetic field. The current energizing the solenoid 46 must be sufficient enough to create a magnetic field that redirects the flux of the permanent magnets of the biasing members 36 (of the second actuator 32) and, in doing so, causes the second actuator 32 to slide on the actuator pin 62 across the air gap 61 toward the second side 72 of the mount 42, thereby drawing the second actuator 32 and the brake lining(s) 40 affixed thereto away from the rail 14. As illustrated in FIGS. 11-12, both solenoids 46 are energized, the brake system 26 is in the picked state and movement along the rail 14 may occur. A rail air gap 63 may be seen between the rail and each of the brake linings 38.

FIG. 12 is a schematic illustration of the redirected magnetic flux as it now forms flux paths 76 flowing between the first biasing member 34 and the first side wall 70 of the mount 42, and the redirected flux as it now forms flux paths 77 flowing between the second biasing member 36 and the second side wall 72 of the mount 42.

When it is desired to slow, stop or hold the machine 16, the electrical coils of each solenoid 46 are de-energized (FIGS. 9-10), thereby allowing the permanent magnets of the biasing members 34 to urge the brake linings 38 into contact with the rail 14.

To assist with the efficiency of the return to the dropped state or to provide emergency braking if current is lost to the solenoids 46, in some embodiments, the rail air gap 63 may be configured to be narrower than the air gap 61 (between each actuator 30, 32 and the respective side of the mount 42) when the brake is in the picked state. Thus, when current is no longer supplied to the solenoids 46 and the electromagnetic field generated by the solenoid 46 decays, flux of the permanent magnets across the relatively narrow rail gap 61 will return from the path determined by the (decaying) electromagnetic field of the solenoids 46 more quickly than if the air gap 61 in the picked state was smaller than the rail gap 63.

Figure 17:
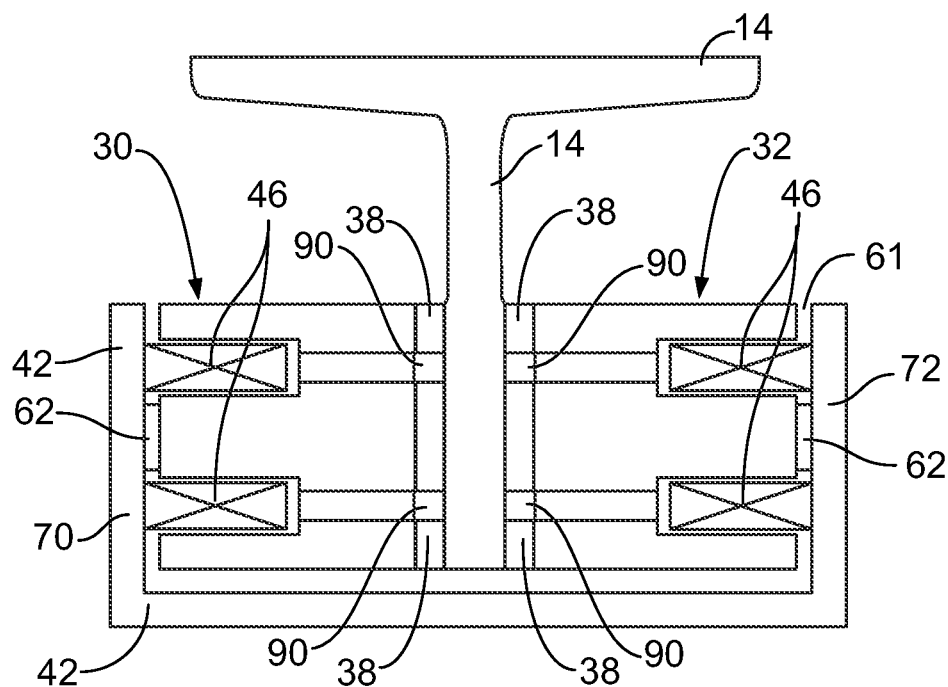
FIG. 17 is a cross-sectional view of an alternative embodiment of a brake constructed in accordance with the teachings of the disclosure, the brake is in the dropped state.
Figure 18:
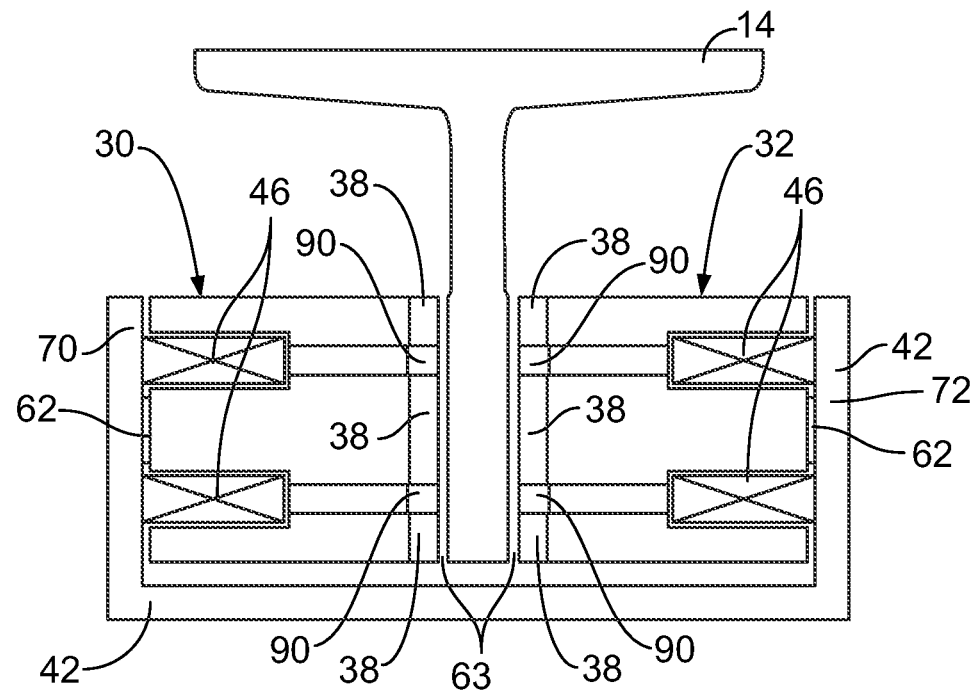
FIG. 18 is a cross-sectional view of the alternative embodiment of the brake of FIG. 19 in a picked state.

FIGS. 17-18, illustrate a variation of the embodiment illustrated in FIGS. 9-12. FIG. 17 illustrates the alternative embodiment in the dropped state. FIG. 18 illustrates the alternative embodiment in the picked state. Similar to the embodiment illustrated in FIGS. 9-12, each brake 26 illustrated in FIGS. 17-18 may comprise first and second actuators 30, 32, a plurality of biasing members 34 and a plurality of brake linings 38. The brake 26 may also comprise a mount 42 and brake guides (not shown).

Similarly, the first and second actuators 30, 32 may each include a backing block 44 and one or more solenoids 46. Each backing block 44 may be slidably secured to the mount 42 by an actuator pin 62 and may be configured to slide axially on the actuator pin 62 toward the rail 14 to an engaged position and away from the rail 14 to a disengaged position. In this alternative embodiment, the solenoids 46 are attached to mount 42 and are stationary with respect to movement of the backing blocks 44.

Like the embodiment illustrated in FIGS. 9-12, one or more brake lining(s) 38 may be affixed to each backing block 44 and may be disposed between such backing block 44 and the side of the rail 14. A non-magnetic portion 90 may be disposed between the brake linings 38. Such a non-magnetic portion 90 may be an air gap or other non-magnetic material. Like the embodiments illustrated in FIGS. 9-12, the backing blocks 44 and brake lining(s) 38 are biased toward the rail 14 by one or more biasing member(s) 34, for example a permanent magnet or the like. Unlike the embodiment shown in FIGS. 9-12, the solenoids 46 do not move with the backing blocks 44. The backing blocks 44, the biasing members 34 and the brake lining(s) 38 slide on the pin 62 but the solenoids 46 do not. With the exception of the stationary solenoids 46, the principles of operation are the same as that depicted in FIGS. 10 and 12 and discussed previously. One of the advantages of this alternative embodiment, is that movable electrical leads are not utilized to supply the coils of the solenoids 46 thus improving the life of the brake.

Referring now to FIGS. 13-16, another embodiment of the brake 26 is illustrated. In this embodiment, the brake 26 may be single-sided with one or more fixed brake lining(s) 38 proximal to the second side of the rail 14, and an actuator 30 and one or more brake lining(s) 38 disposed proximal to the first side of the rail 14. More specifically each brake 26 may comprise an actuator 30, one or more biasing member(s) 34 and a plurality of brake linings 38. The brake 26 may also comprise a mount 42 and one or more brake guides (not pictured). The mount 42 may be generally L-shaped or any other appropriate shape and the actuator 30, biasing member(s) 34 and the brake linings 38 may be disposed inside or on the mount 42.

The actuator 30 may include a backing block 44, one or more solenoid(s) 46, a first armature 48a and a second armature 48b. The backing block 44 may be adjacent to the first side of the rail 14 and may be fixed on the mount 42. In the exemplary embodiment illustrated in FIGS. 13-16, the backing block 44 has a pair of solenoids 46 housed within it. In other embodiments, greater or fewer quantities of solenoids 46 may be housed in the backing block 44.

The second armature 48b may, along with one or more brake lining(s) 38 affixed thereto, be disposed between the backing block 44 and the first side of the rail 14. The first armature 48a may be disposed proximal to a first side 74 of the backing block 44 and distal to the rail 14. The first and second armatures 48a, 48b may be connected together by an actuator pin 62, or the like, extending through or along the backing block 44. The armatures 48a, 48b may be made of a magnetic material and may be axially moveable between an engaged position and a disengaged (from the rail) position. In some embodiments, the armatures 48a, 48b may be sloped at one or both ends.

Figure 13:
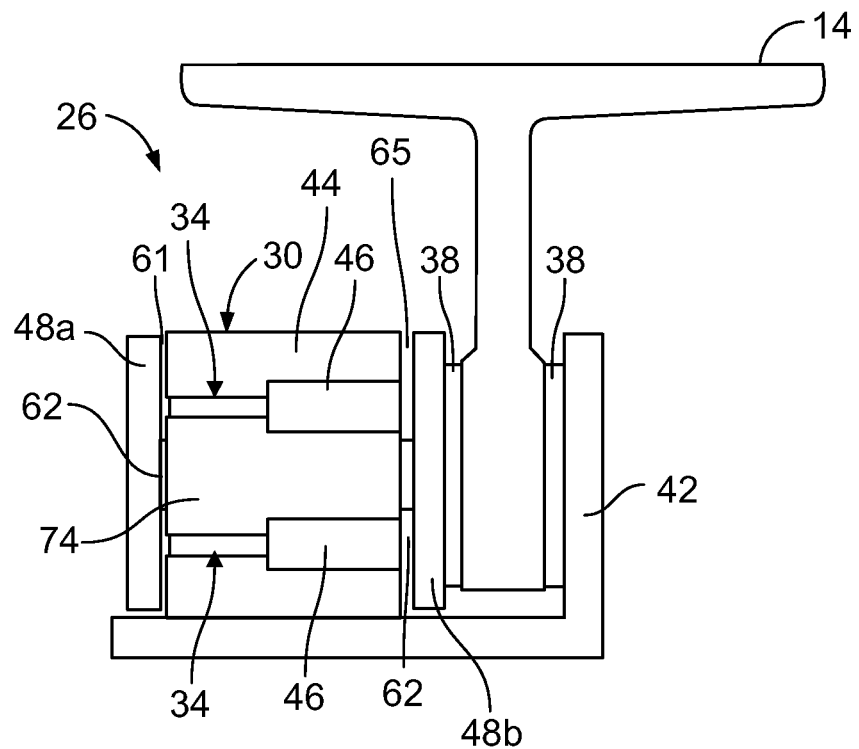
FIG. 13 is a cross-sectional view of another embodiment of a brake constructed in accordance with the teachings of the disclosure, the brake is in the dropped state.
Figure 14:
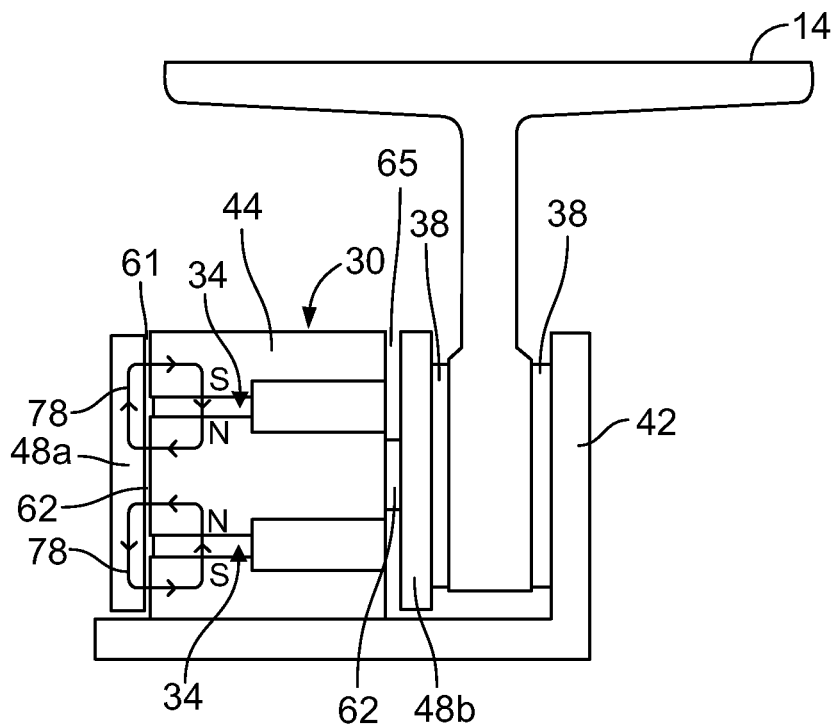
FIG. 14 is a cross-sectional view of the brake of FIG. 13 in a dropped state with the lines of magnetic flux schematically illustrated.

In the engaged position illustrated in FIGS. 13-14, the first armature 48a has moved across the air gap 61 toward the backing block 44, thereby causing the second armature 48b to move toward the rail 14 such that the brake lining 38 affixed to the second armature 48b engages the rail 14 and pushes the rail 14 against the brake lining(s) 38 affixed to the side of the mount 42 in order to slow, stop or hold the machine 16 via friction. This is known as the dropped state. The movement of the second armature 48b toward the rail 14 widens the air gap 65 between the second armature 48b and the backing block 44 and narrows air gap 61.

Figure 15:
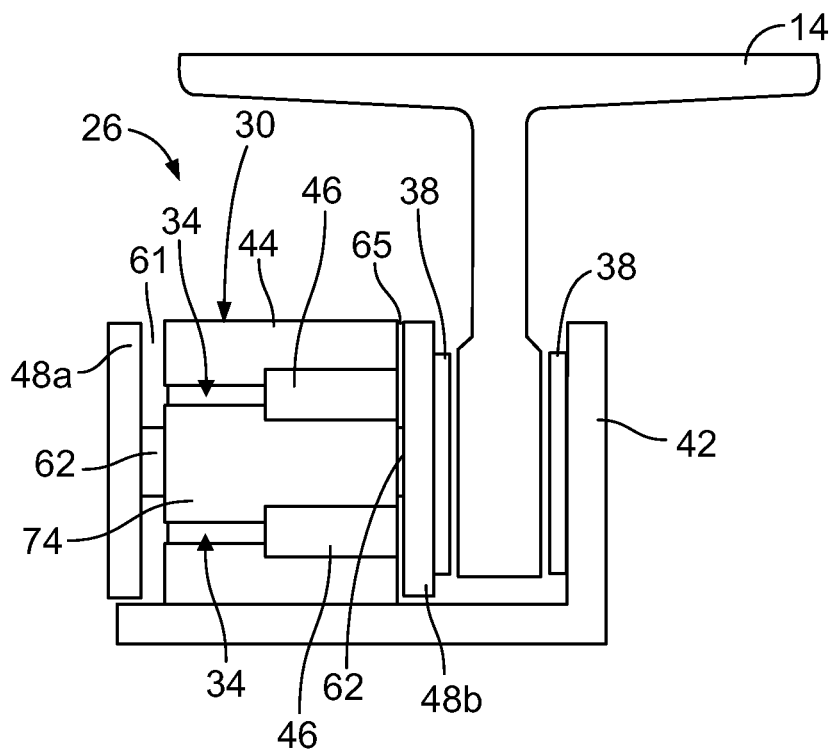
FIG. 15 is a cross-sectional view of another embodiment of a brake constructed in accordance with the teachings of the disclosure, the brake is in a picked state.
Figure 16:
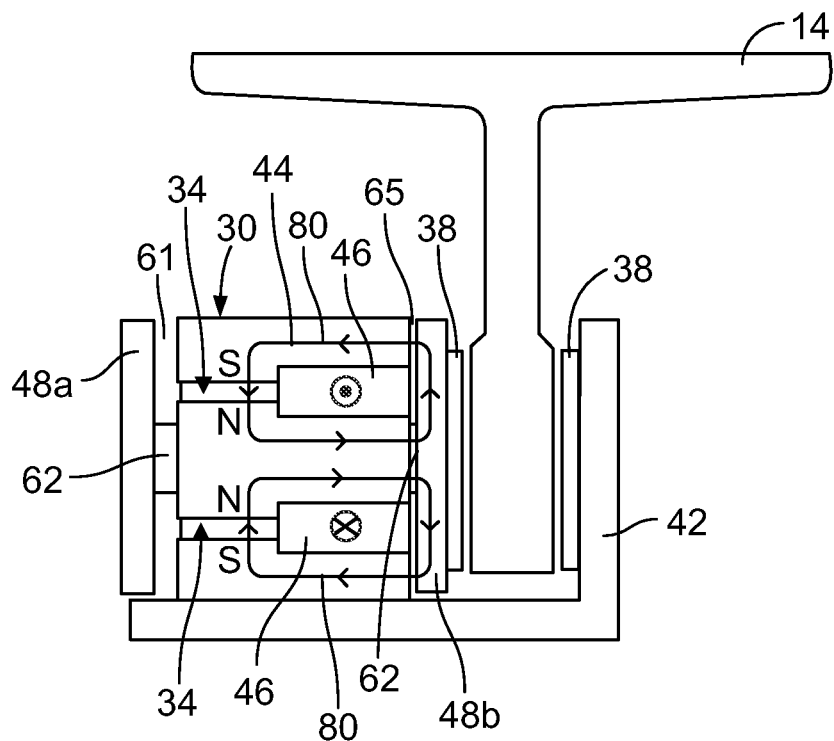
FIG. 16 is a cross-sectional view of the brake of FIG. 15 in a picked state with the lines of magnetic flux schematically illustrated.

In the disengaged position illustrated in FIGS. 15-16, the second armature 48b and the brake lining(s) 38 affixed thereto have moved axially away from the rail 14 across the air gap 65 toward the backing block 44 such that the brake lining 38 no longer engages the first side of the rail 14. This is known as the picked state. The movement of the second armature 48b axially away from the rail 14 also moves the first armature 48a away from the backing block 44 because the two armatures 48a and 48b are connected via the actuator pin 62. This movement of the first armature 48a widens air gap 61 and narrows air gap 65.

The second armature 48b and the brake lining 38 affixed to it are biased toward the rail 14 by biasing members 34. In one embodiment, the biasing members 34 may be one or more permanent magnets, or the like. The biasing members 34 may be partially or entirely internal to the backing block 44, or external to the backing block 44. In the embodiment illustrated in FIGS. 13-16, the biasing members 34 are disposed in the backing block 44. While in FIGS. 13-16 only one brake lining 38 on each side of the rail is visible, the embodiment may include more than one brake lining 38 disposed proximal to each side of the rail 14. In the embodiment described above, the brake lining(s) 38 disposed proximal to the second side of the rail 14 may be affixed to the side of the mount 42 and may not move.

FIGS. 13-14 illustrate the exemplary brake 26 when the actuator 30 is in the dropped state. In this state, a normal force is being applied to the rail 14. This normal force is generated by the magnetic force generated by the permanent magnets of the biasing members 34. As illustrated in FIG. 14, the flux flowing through the permanent magnets takes a path through the first armature 48a causing the first armature 48a to move across the air gap 61 toward the backing block 44. FIG. 14 is a schematic diagram illustrating the flux paths 78 created by the permanent magnets. Because the first armature 48a is connected to the second armature 48b through a sliding actuator pin 62, the attraction force of the first armature 48a to the permanent magnets is transferred through the actuator pin 62 to the second armature 48b, the brake lining 38 affixed to it, and to the rail 14. The resulting friction between the rail 14 and the material of the brake linings 34 stops and holds the machine 16 (FIG. 1).

When the actuator 30 is energized (FIGS. 15-16), the electrical coils of the solenoids 46 (in one embodiment, copper coil windings) generate a magnetic field. The magnetic field redirects the flux of the permanent magnets of the biasing members 34 and in doing so draws the second armature 48b, and the brake lining 38 affixed to it, away from the rail 14. As illustrated in FIG. 15, the solenoids 46 of the actuator 30 are energized, the brake 26 is in the picked state and movement along the rail 14 may occur. FIG. 16 illustrates the redirected flux path 80 in the picked state. The flux now flows from the permanent magnets of the biasing members 34 into the second armature 48b. The flux flowing through the second armature 48b creates an attraction force that moves the second armature 48b across the air gap 65 toward the backing block 44.

After the brake 26 has begun to move into the picked state, the amount of current supplied to the solenoids 46 may be reduced because the magnetic force across the air gap 65 increases as the width of the air gap 65 is reduced. Thus, a smaller amount of current (than that supplied initially) may be used to continue to move the armature (48b) across the air gap 65 and to hold the brake 26 in the picked state. This contrasts with brakes that utilize a spring. When such brakes move toward the picked state, more input force is required to further compress the spring.

When it is desired to slow, stop or hold the machine, the electrical coils of the solenoids 46 are de-energized, thereby allowing the biasing member 34 to urge the brake lining 38 affixed to the second armature 48b into contact with the rail 14 and the rail 14 into contact with the brake lining 40 affixed to the mount 42.

Similar to the previous embodiment, to assist with the efficiency of the return to the dropped state or to provide emergency braking if current is lost to the solenoids 46, in some embodiments, the air gap 65 may be configured to be narrower than air gap 61 when the brake is in the picked state. Thus, when current is no longer supplied to the solenoids 46 and the electromagnetic field generated by the solenoid 46 decays, flux of the permanent magnets across the relatively narrow gap 65 will return from the path determined by the (decaying) electromagnetic field of the solenoids 46 more quickly than if the air gap 61 in the picked state was smaller than the air gap 65 between the second armature 48b and the backing block 44.

INDUSTRIAL APPLICABILITY

In light of the foregoing, it can be seen that the present disclosure sets forth a brake for an industrial machine. Various improvements over industrial brakes currently utilized are disclosed. Among such improvements is the use of a sloped armature 48. Such geometry beneficially increases the surface area of the armature 48 face 58 adjacent to the air gap 60 between the solenoid 46 and the armature 48 while reducing the possibility of physical interference of the armature 48 with the braking action. By increasing the surface area of the face 58 near the relatively small air gap 60, a stronger magnetic bond may be created between the armature 48 and the backing block 44. Further the use of permanent magnets in place of mechanical springs allows a smaller amount of current (than that supplied initially) to be used to continue to pick the brake and hold it in the picked state.

While only certain embodiments have been set forth, alternatives and modifications will be apparent from the above description to those skilled in the art. These and other alternatives are considered equivalents and within the spirit and scope of this disclosure.

What is claimed is:

1. A brake comprising:
a first brake lining configured to be frictionally engageable with a rail;
a second brake lining configured to be frictionally engageable with the rail;
a first biasing member configured to urge the first brake lining to engage the rail;
a first actuator configured to move the first brake lining to disengage the rail when the first actuator is energized;
a second biasing member configured to urge the second brake lining to engage the rail; and
a second actuator configured to move the second brake lining to disengage the rail when the second actuator is energized;
a mount upon which the first and second actuators are disposed, the mount having a first side wall and a second side wall,
wherein the first actuator comprises a backing block and a first solenoid housed in the backing block, and the second actuator comprises a second backing block and a second solenoid housed in the backing block, wherein the first and second biasing members are permanent magnets;
wherein in an engaged state, the first biasing member urges the first brake lining to engage the rail and the second biasing member urges the second brake lining to engage the rail, the permanent magnets of the first biasing member and the second biasing member generating first flux path from the first biasing member, across the rail, to the second biasing member, across the rail and back to the first biasing member;
wherein in a disengaged state, the first actuator moves the first brake lining to disengage the rail and the second actuator moves the second brake lining to disengage the rail, wherein the first actuator at least partially redirects the first flux path into a second flux path that draws the first actuator toward the first side wall of the mount, the second flux path flowing from the first actuator to the first side wall, and wherein the second actuator at least partially redirects the first flux path into a third flux path that draws the second actuator toward the second side wall of the mount, the third flux path flowing from the second actuator to the second side wall.

2. The brake of claim 1, wherein the backing block is configured to slide axially on an actuator pin and the second backing block is configured to slide axially on a second actuator pin.

* * * * *